US010951691B2

(12) United States Patent
Mishra et al.

(10) Patent No.: US 10,951,691 B2
(45) Date of Patent: Mar. 16, 2021

(54) LOAD BALANCING IN A DISTRIBUTED SYSTEM

(71) Applicant: Cisco Technology, Inc., San Jose, CA (US)

(72) Inventors: Rakesh Mishra, Milpitas, CA (US); Amitesh Shukla, San Ramon, CA (US); Manish Jhanji, Santa Clara, CA (US); Satpal Dalal, Cupertino, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 80 days.

(21) Appl. No.: 16/292,673

(22) Filed: Mar. 5, 2019

(65) Prior Publication Data

US 2020/0287962 A1 Sep. 10, 2020

(51) Int. Cl.
*G06F 15/173* (2006.01)
*H04L 29/08* (2006.01)
*H04L 12/26* (2006.01)

(52) U.S. Cl.
CPC ........ *H04L 67/1008* (2013.01); *H04L 43/065* (2013.01); *H04L 67/1031* (2013.01)

(58) Field of Classification Search
CPC ... H04L 41/145; H04L 43/08; H04L 43/0876; H04L 63/1408; H04L 47/125; H04L 67/1008; H04L 67/1012; H04L 67/1029; H04L 67/1031
USPC ................................................. 709/223, 226
See application file for complete search history.

(56) References Cited

U.S. PATENT DOCUMENTS

| | | |
|---|---|---|
| 9,923,958 B1 | 3/2018 | Glover et al. |
| 2011/0078303 A1 | 3/2011 | Li et al. |
| 2016/0099871 A1* | 4/2016 | Chiduruppa ........ H04L 65/1073 709/226 |
| 2016/0255013 A1 | 9/2016 | Cox et al. |
| 2017/0046146 A1 | 2/2017 | Jamjoom et al. |

* cited by examiner

*Primary Examiner* — Wing F Chan
*Assistant Examiner* — Andrew Woo
(74) *Attorney, Agent, or Firm* — Polsinelli PC

(57) ABSTRACT

Systems, methods, and computer-readable media are disclosed for implementing a load balance update. A system may be configured to receive a plurality performance reports for a plurality of service nodes running on the plurality of host entities, wherein each performance report comprises performance indicators for a service node in the plurality of service nodes running on a host entity in the plurality of host entities, generate a load balance update based on the performance reports, and implement the load balance update at a load balancer.

20 Claims, 8 Drawing Sheets

LOAD BALANCING IN A DISTRIBUTED SYSTEM

TECHNICAL FIELD

The present technology pertains to network load balancing, and more specifically to service driven load balancing in a distributed system.

BACKGROUND

Load balancing is the distribution of workloads across multiple computing resources in order to improve the functioning of a system. For example, effective load balancing implementations may optimize resource usage, maximize throughput, minimize response time, and/or overload resources in a system. Load balancing is often achieved by a load balancer that divides workloads/traffic between network resources. Some implementations may use a round-robin method of distributing workloads or other randomized methods of load balancing.

Load balancing is especially important in distributed systems such as cloud-based environments. Many industries are transitioning towards running their applications or other computing resources on cloud-based virtual machines or servers, which are billed per unit time (e.g., hourly) and can be costly. When an application is running on a virtual machine, but the application is not being used, or is experiencing latency issues, the costs associated with the application use may go up.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1A:
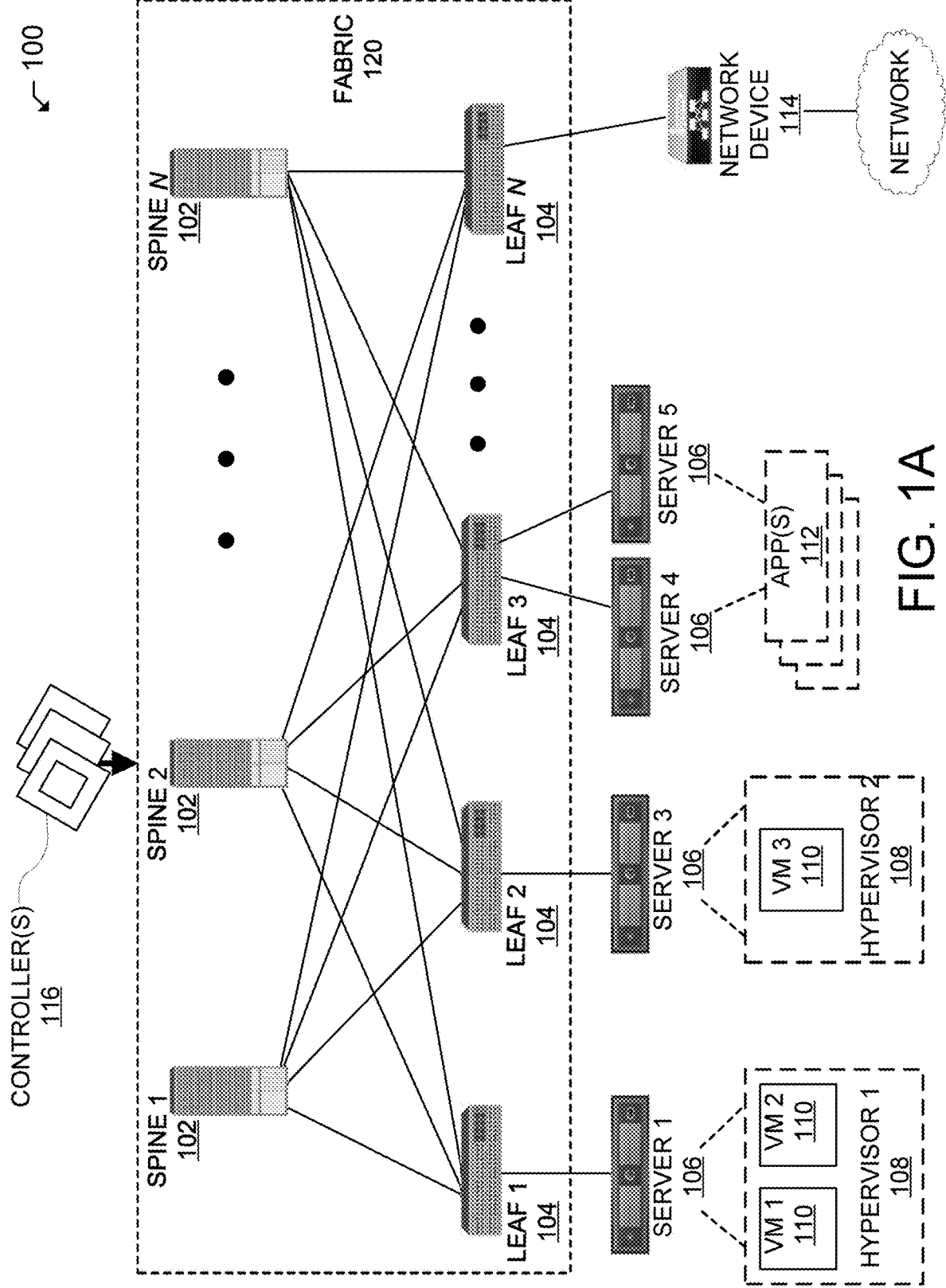
FIGS. 1A and 1B illustrate example network environments, in accordance with various aspects of the subject technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be references to the same embodiment or any embodiment; and, such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for convenience of a reader, which in no way should limit the scope of the disclosure. Unless otherwise defined, technical, and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Overview

Disclosed herein are systems, methods, and computer-readable media for configuring or reconfiguring a load balancer. A system may be configured to receive, from a host entity, performance indicators for a service node on the host entity. The service node may be associated with operating parameters in a registration record for the service node. The system may be configured to generate a load balance update, based on the operating parameters for the service node and the performance indicators and implement the load balance update at a load balancer.

Example Embodiments

The disclosed technology addresses the need in the art for more effective and efficient load balancing in a network. Many load balancers are configured to attempt to distribute workloads and/or traffic evenly across network resources (e.g., server machines, virtual machines, containers, or other host entities). However, in some cases, the network resources may operate under different environments and circumstances. For example, some network resources may have different capabilities, functionalities, or characteristics (e.g., processing power, bandwidth, memory, geographic location, configurations, operating systems and other supporting software, etc.) than other network resources. Furthermore, some network resources may be operating under different utilization levels and/or loads. The network resources may also host different numbers and/or types service nodes (e.g., applications, services, micro-services, processes, etc.) which may contribute to the different utilization levels and latencies. Accordingly, attempting to distribute workloads and/or traffic evenly across network resources may not effectively account for the actual environment and circumstances in which the network resources currently experience.

As is discussed in further detail, various aspects of the subject technology relate to taking into consideration the actual environment and circumstances in which the network resources experience when configuring the load balancing functionality of the system. As a result, the configuration of a load balancer may be updated to direct workloads to network resources that are able to handle additional workloads relative to other network resources, create additional service node instances or network resources when needed, and/or shut down services nodes instances or network resources when not needed. By taking into consideration the actual environment and circumstances in which the network resources experience when configuring the load balancing functionality of the system, the load balancing of the system may more effectively route workloads to network resources, which may reduce the number of network resources needed which saves computing resources as well as the costs associated with the network resources. Furthermore, the load balancing may be able to spin up or spin down network resources as needed, providing a more customized system configuration that fits the workload requirements of the system as the requirements change over time.

Various aspects of the subject technology also relate to enabling the system to take into consideration information at additional levels of granularity when updating load balancer operations. For example, network resources may include server machines, virtual machines, containers, or other entities configured to host one or more service nodes. Service nodes may include applications, services, micro-services, processes, or other entities configured to operate on a host entity and perform work or other function (e.g., execute a workload). Information regarding environment and circumstances at the service node level for each host entity may be used to configure the load balancing functionality of the system.

As is discussed in further detail, information at the service node level enables load balancing of the system to be more accurate and efficient. For example, metrics (e.g., bandwidth, response time, latency, computing resource usage, etc.) at a host entity level may indicate that a particular host entity may handle additional workloads. However, the host entity may host several different applications and while some applications may be operating within acceptable parameters, other applications (or other types of service nodes) may not be operating within acceptable parameters. For example, some applications on the host entity may be performing well while another application on the host entity may be experiencing high latency, slow response times, etc. These situations are not visible based on information at a host entity level. Aspects of the subject technology provide additional granularity and additional levels of configuration in load balancing such that the load balancing configuration of a system is more accurate and effective.

Having described various aspects of the load balancing technology, the disclosure now turns to a discussion of example network environments for load balancing system. Although some network environments (e.g., datacenter networks) are discussed for illustrative purposes, other types of networks may also be used.

FIG. 1A illustrates example network environments, in accordance with various aspects of the subject technology. In particular, FIG. 1A illustrates a diagram of an example Network Environment 100, such as a data center. The Network Environment 100 can include a Fabric 120 which can represent the physical layer or infrastructure (e.g., underlay) of the Network Environment 100. Fabric 120 can include Spines 102 (e.g., spine routers or switches) and Leafs 104 (e.g., leaf routers or switches) which can be interconnected for routing or switching traffic in the Fabric 120. Spines 102 can interconnect Leafs 104 in the Fabric 120, and Leafs 104 can connect the Fabric 120 to an overlay or logical portion of the Network Environment 100, which can include application services, servers, virtual machines, containers, endpoints, etc. Thus, network connectivity in the Fabric 120 can flow from Spines 102 to Leafs 104, and vice versa. The interconnections between Leafs 104 and Spines 102 can be redundant (e.g., multiple interconnections) to avoid a failure in routing. In some embodiments, Leafs 104 and Spines 102 can be fully connected, such that any given Leaf is connected to each of the Spines 102, and any given Spine is connected to each of the Leafs 104. Leafs 104 can be, for example, top-of-rack ("ToR") switches, aggregation switches, gateways, ingress and/or egress switches, provider edge devices, and/or any other type of routing or switching device.

Leafs 104 can be responsible for routing and/or bridging tenant or customer packets and applying network policies or rules. Network policies and rules can be driven by one or more Controllers 116, and/or implemented or enforced by one or more devices, such as Leafs 104. Leafs 104 can connect other elements to the Fabric 120. For example, Leafs 104 can connect Servers 106, Hypervisors 108, Virtual Machines (VMs) 110, Applications 112, Network Device 114, etc., with Fabric 120. Such elements can reside in one or more logical or virtual layers or networks, such as an overlay network. In some cases, Leafs 104 can encapsulate and decapsulate packets to and from such elements (e.g., Servers 106) in order to enable communications throughout Network Environment 100 and Fabric 120. Leafs 104 can also provide any other devices, services, tenants, or workloads with access to Fabric 120. In some cases, Servers 106 connected to Leafs 104 can similarly encapsulate and decapsulate packets to and from Leafs 104. For example, Servers 106 can include one or more virtual switches or routers or tunnel endpoints for tunneling packets between an overlay or logical layer hosted by, or connected to, Servers 106 and an underlay layer represented by Fabric 120 and accessed via Leafs 104.

Applications 112 can include software applications, services, containers, appliances, functions, service chains, etc. For example, Applications 112 can include a firewall, a database, a content delivery network (CDN) server, an intrusion defense system (IDS) or intrusion prevention system (IPS), a deep packet inspection service, a message router, a virtual switch, etc. An application from Applications 112 can be distributed, chained, or hosted by multiple endpoints (e.g., Servers 106, VMs 110, etc.), or may run or execute entirely from a single endpoint.

VMs 110 can be virtual machines hosted by Hypervisors 108 or virtual machine managers running on Servers 106. VMs 110 can include workloads running on a guest operating system on a respective server. Hypervisors 108 can provide a layer of software, firmware, and/or hardware that creates, manages, and/or runs the VMs 110. Hypervisors 108 can allow VMs 110 to share hardware resources on Servers 106, and the hardware resources on Servers 106 to appear as multiple, separate hardware platforms. Moreover, Hypervisors 108 on Servers 106 can host one or more VMs 110.

In some cases, VMs 110 and/or Hypervisors 108 can be migrated to other Servers 106. Servers 106 can similarly be migrated to other locations in Network Environment 100. For example, a server connected to a specific leaf can be changed to connect to a different or additional leaf. Such configuration or deployment changes can involve modifications to settings, configurations, and policies that are applied to the resources being migrated as well as other network components.

In some cases, one or more Servers 106, Hypervisors 108, and/or VMs 110 can represent or reside in a tenant or customer space. Tenant space can include workloads, services, applications, devices, networks, and/or resources that are associated with one or more clients or subscribers. Accordingly, traffic in Network Environment 100 can be routed based on specific tenant policies, spaces, agreements, configurations, etc. Moreover, addressing can vary between one or more tenants. In some configurations, tenant spaces can be divided into logical segments and/or networks and separated from logical segments and/or networks associated with other tenants. Addressing, policy, security, and configuration information between tenants can be managed by Controllers 116, Servers 106, Leafs 104, etc.

Configurations in Network Environment 100 can be implemented at a logical level, a hardware level (e.g., physical), and/or both. For example, configurations can be implemented at a logical and/or hardware level based on endpoint or resource attributes, such as endpoint types and/or application groups or profiles, through a software-defined network (SDN) framework (e.g., Application-Centric Infrastructure (ACI) or VMWARE NSX). To illustrate, one or more administrators can define configurations at a logical level (e.g., application or software level) through Controllers 116, which can implement or propagate such configurations through Network Environment 100. In some examples, Controllers 116 can be Application Policy Infrastructure Controllers (APICs) in an ACI framework. In other examples, Controllers 116 can be one or more management components for associated with other SDN solutions, such as NSX Managers.

Such configurations can define rules, policies, priorities, protocols, attributes, objects, etc., for routing and/or classifying traffic in Network Environment 100. For example, such configurations can define attributes and objects for classifying and processing traffic based on Endpoint Groups (EPGs), Security Groups (SGs), VM types, bridge domains (BDs), virtual routing and forwarding instances (VRFs), tenants, priorities, firewall rules, etc. Other example network objects and configurations are further described below. Traffic policies and rules can be enforced based on tags, attributes, or other characteristics of the traffic, such as protocols associated with the traffic, EPGs associated with the traffic, SGs associated with the traffic, network address information associated with the traffic, etc. Such policies and rules can be enforced by one or more elements in Network Environment 100, such as Leafs 104, Servers 106, Hypervisors 108, Controllers 116, etc. As previously explained, Network Environment 100 can be configured according to one or more particular software-defined network (SDN) solutions, such as CISCO ACI or VMWARE NSX. These example SDN solutions are briefly described below.

ACI can provide an application-centric or policy-based solution through scalable distributed enforcement. ACI supports integration of physical and virtual environments under a declarative configuration model for networks, servers, services, security, requirements, etc. For example, the ACI framework implements EPGs, which can include a collection of endpoints or applications that share common configuration requirements, such as security, QoS, services, etc. Endpoints can be virtual/logical or physical devices, such as VMs, containers, hosts, or physical servers that are connected to Network Environment 100. Endpoints can have one or more attributes such as a VM name, guest OS name, a security tag, application profile, etc. Application configurations can be applied between EPGs, instead of endpoints directly, in the form of contracts. Leafs 104 can classify incoming traffic into different EPGs. The classification can be based on, for example, a network segment identifier such as a VLAN ID, VXLAN Network Identifier (VNID), Network Virtualization using Generic Routing Encapsulation (NVGRE) Virtual Subnet Identifier (VSID), MAC address, IP address, etc.

In some cases, classification in the ACI infrastructure can be implemented by Application Virtual Switches (AVS), which can run on a host, such as a server or switch. For example, an AVS can classify traffic based on specified attributes, and tag packets of different attribute EPGs with different identifiers, such as network segment identifiers (e.g., VLAN ID). Finally, Leafs 104 can tie packets with their attribute EPGs based on their identifiers and enforce policies, which can be implemented and/or managed by one or more Controllers 116. Leaf 104 can classify to which EPG the traffic from a host belongs and enforce policies accordingly.

Another example SDN solution is based on VMWARE NSX. With VMWARE NSX, hosts can run a distributed firewall (DFW) which can classify and process traffic. Consider a case where three types of VMs, namely, application, database, and web VMs, are put into a single layer-2 network segment. Traffic protection can be provided within the network segment based on the VM type. For example, HTTP traffic can be allowed among web VMs, and disallowed between a web VM and an application or database VM. To classify traffic and implement policies, VMWARE NSX can implement security groups, which can be used to group the specific VMs (e.g., web VMs, application VMs, and database VMs). DFW rules can be configured to implement policies for the specific security groups. To illustrate, in the context of the previous example, DFW rules can be configured to block HTTP traffic between web, application, and database security groups.

Returning now to FIG. 1A, Network Environment 100 can deploy different hosts via Leafs 104, Servers 106, Hypervisors 108, VMs 110, Applications 112, and Controllers 116, such as VMWARE ESXi hosts, WINDOWS HYPER-V hosts, bare metal physical hosts, etc. Network Environment 100 may interoperate with a variety of Hypervisors 108, Servers 106 (e.g., physical and/or virtual servers), SDN orchestration platforms, etc. Network Environment 100 may implement a declarative model to allow its integration with application design and holistic network policy.

Controllers 116 can provide centralized access to fabric information, application configuration, resource configuration, application-level configuration modeling for a software-defined network (SDN) infrastructure, integration with management systems or servers, etc. Controllers 116 can form a control plane that interfaces with an application plane via northbound APIs and a data plane via southbound APIs.

As previously noted, Controllers 116 can define and manage application-level model(s) for configurations in Network Environment 100. In some cases, application or device configurations can also be managed and/or defined by other components in the network. For example, a hypervisor or virtual appliance, such as a VM or container, can run a server or management tool to manage software and services in Network Environment 100, including configurations and settings for virtual appliances.

As illustrated above, Network Environment 100 can include one or more different types of SDN solutions, hosts, etc. For the sake of clarity and explanation purposes, various examples in the disclosure will be described with reference to an ACI framework, and Controllers 116 may be interchangeably referenced as controllers, APICs, or APIC controllers. However, it should be noted that the technologies and concepts herein are not limited to ACI solutions and may be implemented in other architectures and scenarios, including other SDN solutions as well as other types of networks which may not deploy an SDN solution.

Further, as referenced herein, the term "hosts" or "host entities" can refer to Servers 106 (e.g., physical or logical), Hypervisors 108, VMs 110, containers (e.g., Applications 112), etc., and can run or include any type of server or application solution. Non-limiting examples of "hosts" can include virtual switches or routers, such as distributed virtual switches (DVS), application virtual switches (AVS), vector packet processing (VPP) switches; VCENTER and NSX MANAGERS; bare metal physical hosts; HYPER-V hosts; VMs; DOCKER Containers; etc.

As is discussed in further detail further below, one or more load balancers may be configured to distribute workloads (e.g., traffic, application requests, queries, etc.) across multiple host entities and/or service nodes running on the host entities. A configuration manager may be configured to receive key performance indicators (KPIs) for service nodes running on the various host entities and update the configuration of the one or more load balancers accordingly. The configuration manager, in some embodiments, may be a part of the load balancer, a part of the Controllers 116, and/or a separate entity.

Figure 1B:
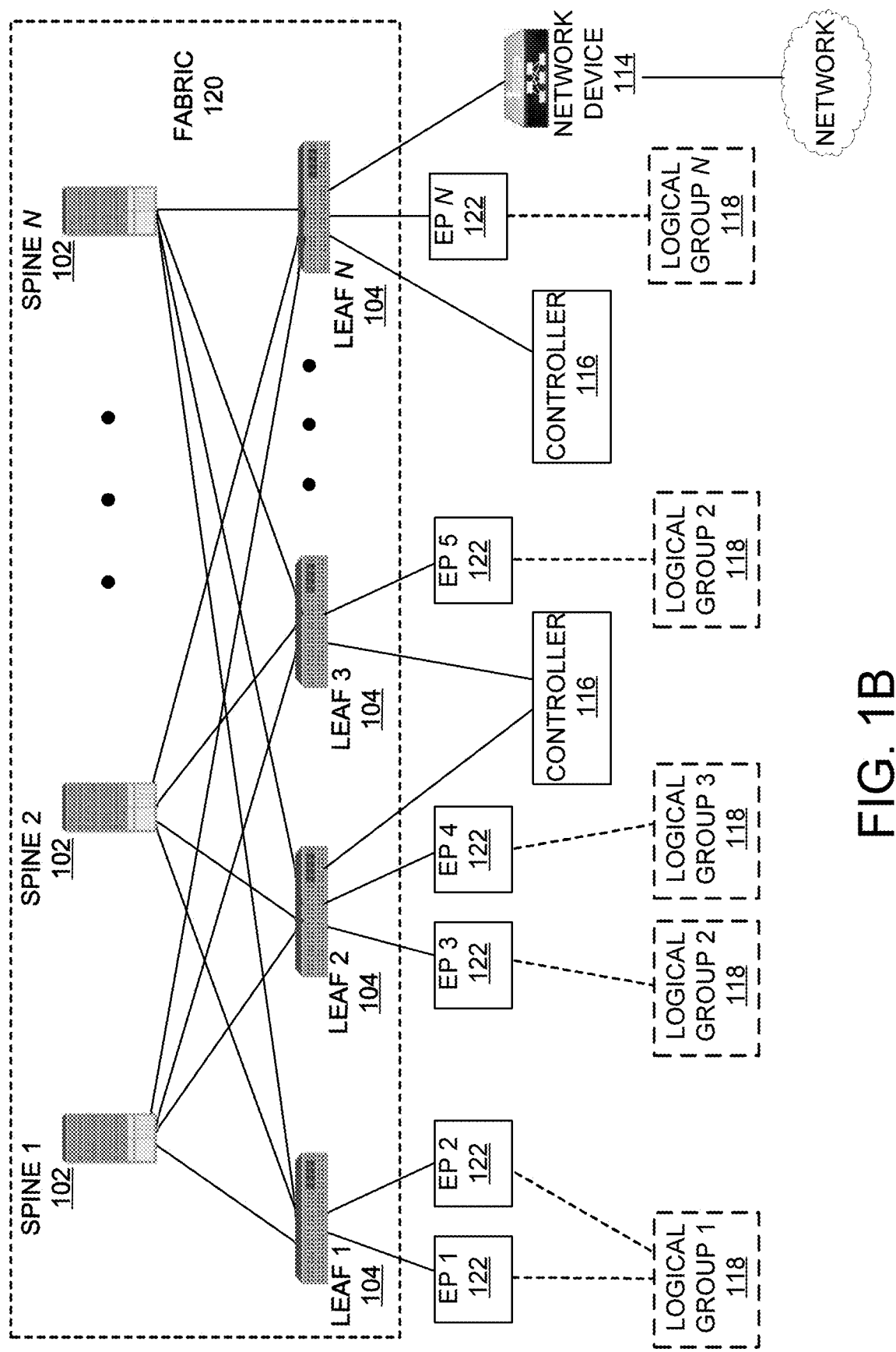

FIG. 1B illustrates example network environments, in accordance with various aspects of the subject technology. In particular, FIG. 1B illustrates another example of Network Environment 100. In this example, Network Environment 100 includes Endpoints 122 connected to Leafs 104 in Fabric 120. Endpoints 122 can be physical and/or logical or virtual entities, such as servers, clients, VMs, hypervisors, software containers, applications, resources, network devices, workloads, etc. For example, an Endpoint 122 can be an object that represents a physical device (e.g., server, client, switch, etc.), an application (e.g., web application, database application, etc.), a logical or virtual resource (e.g., a virtual switch, a virtual service appliance, a virtualized network function (VNF), a VM, a service chain, etc.), a container running a software resource (e.g., an application, an appliance, a VNF, a service chain, etc.), storage, a workload or workload engine, etc. Endpoints 122 can have an address (e.g., an identity), a location (e.g., host, network segment, virtual routing and forwarding (VRF) instance, domain, etc.), one or more attributes (e.g., name, type, version, patch level, OS name, OS type, etc.), a tag (e.g., security tag), a profile, etc.

Endpoints 122 can be associated with respective Logical Groups 118. Logical Groups 118 can be logical entities containing endpoints (physical and/or logical or virtual) grouped together according to one or more attributes, such as endpoint type (e.g., VM type, workload type, application type, etc.), one or more requirements (e.g., policy requirements, security requirements, QoS requirements, customer requirements, resource requirements, etc.), a resource name (e.g., VM name, application name, etc.), a profile, platform or operating system (OS) characteristics (e.g., OS type or name including guest and/or host OS, etc.), an associated network or tenant, one or more policies, a tag, etc. For example, a logical group can be an object representing a collection of endpoints grouped together. To illustrate, Logical Group 1 can contain client endpoints, Logical Group 2 can contain web server endpoints, Logical Group 3 can contain application server endpoints, Logical Group N can contain database server endpoints, etc. In some examples, Logical Groups 118 are EPGs in an ACI environment and/or other logical groups (e.g., SGs) in another SDN environment.

Traffic to and/or from Endpoints 122 can be classified, processed, managed, etc., based Logical Groups 118. For example, Logical Groups 118 can be used to classify traffic to or from Endpoints 122, apply policies to traffic to or from Endpoints 122, define relationships between Endpoints 122, define roles of Endpoints 122 (e.g., whether an endpoint consumes or provides a service, etc.), apply rules to traffic to or from Endpoints 122, apply filters or access control lists (ACLs) to traffic to or from Endpoints 122, define communication paths for traffic to or from Endpoints 122, enforce requirements associated with Endpoints 122, implement security and other configurations associated with Endpoints 122, etc.

In an ACI environment, Logical Groups 118 can be EPGs used to define contracts in the ACI. Contracts can include rules specifying what and how communications between EPGs take place. For example, a contract can define what provides a service, what consumes a service, and what policy objects are related to that consumption relationship. A contract can include a policy that defines the communication path and all related elements of a communication or relationship between endpoints or EPGs. For example, a Web EPG can provide a service that a Client EPG consumes, and that consumption can be subject to a filter (ACL) and a service graph that includes one or more services, such as firewall inspection services and server load balancing.

One or more load balancers may be configured to distribute workloads (e.g., traffic, application requests, queries, etc.) across multiple host entities (e.g., logical groups or endpoints) and/or service nodes running on the host entities. A configuration manager may be configured to receive key performance indicators (KPIs) for service nodes running on the various host entities and update the configuration of the one or more load balancers accordingly.

Figure 2:
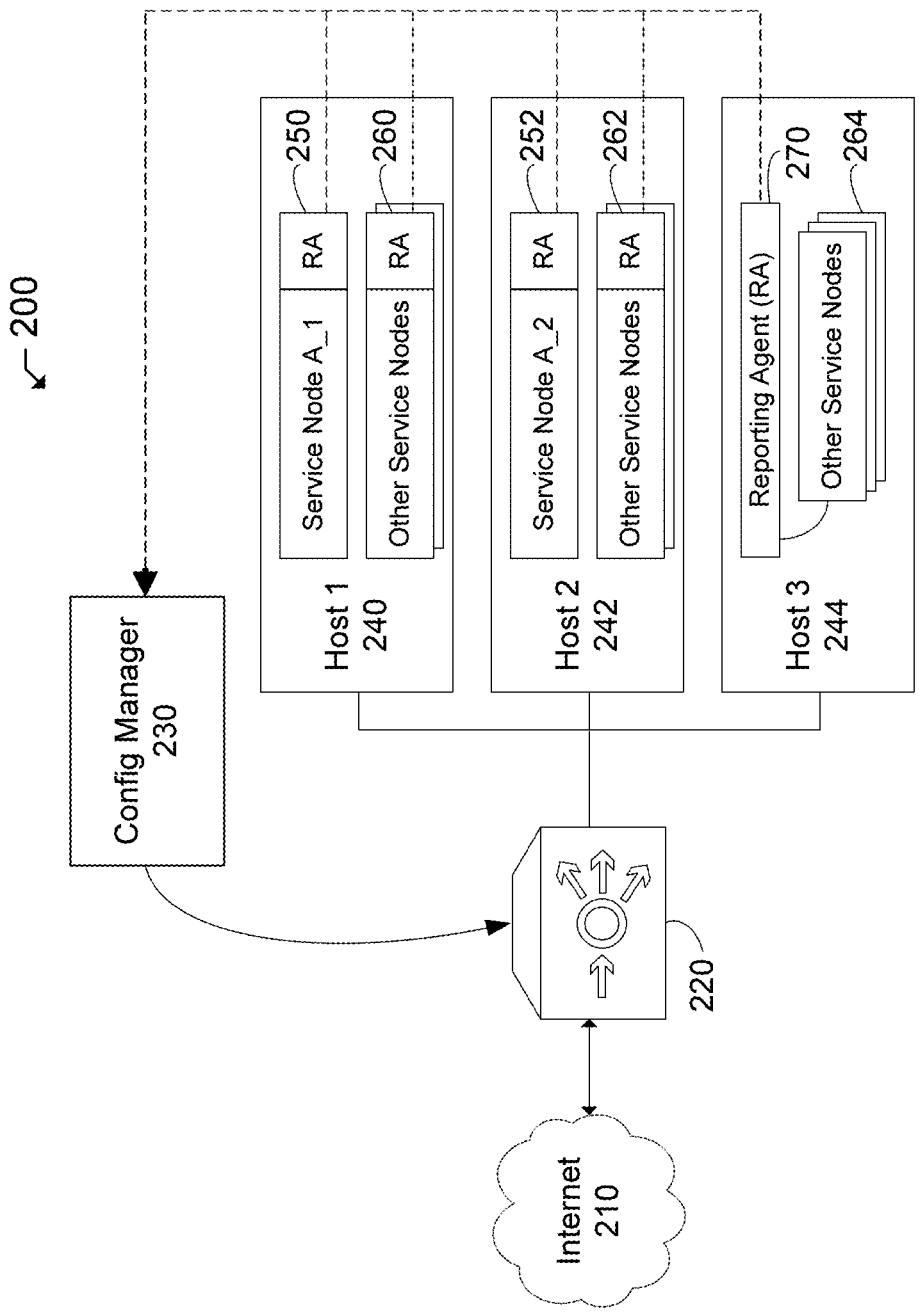
FIG. 2 illustrates an example network environment for a load balancer and configuration manager, in accordance with various aspects of the subject technology.

FIG. 2 illustrates an example network environment 200 for a load balancer 220 and configuration manager 230, in accordance with various aspects of the subject technology. FIG. 2 is shown for illustrative purposes and other configurations may also be used. For example, in some embodiments, multiple load balancers may be used and configured by the configuration manager 230 and, in some embodiments, the configuration manager 230 may be a part of a network controller, one or more load balancers, a service running on one or more host entities, and/or a separate entity. The network environment 200 further includes hosts or host entities 240, 242, and 244.

Service nodes 250, 252, 260, 262, and 264 are each configured to run on a host entity and process and perform the various workloads. The service nodes 250, 252, 260, 262, and 264 may be of different types and/or perform different workloads. For example, service node A_1 250 and service node A_2 252 may be associated with a particular application. Service node A_1 250 and service node A_2 252 may be two instances of the same application, two micro-services, services, or processes associated with the same application, configured to perform the same workloads or workloads of a particular type. The other service nodes 260, 262, and 264 may be different than service node A_1 250 and service node A_2 252 and/or configured to perform different workloads.

In FIG. 2, workload requests and/or traffic is received by the load balancer 220 via the internet 210 or other network (e.g., a wide area network, local area network, etc.). The load balancer 220 is configured to distribute workload requests and/or traffic to one or more hosts 240, 242, and 244 and/or service nodes in the network environment 200. In some cases, the workload requests may be of a particular type that only a certain service nodes are configured to perform (e.g., service node A_1 250 and service node A_2 252) or directed to a certain type of service nodes associated with a particular application.

The load balancer 220 may have configuration settings or a configuration profile that specifies how the workload requests are distributed. The configuration manager 230 is configured to receive performance indicators associated with the various service nodes and update the configuration profile or configuration settings for the load balancer 220 based on the performance indicators. The performance indicators are received from one or more reporting agents and may include, for example, a current number of jobs in a queue for the application, average processing time, latency metrics, or error counts.

The reporting agents may be a part of or embedded in the service nodes, such as in services nodes 250, 252, 260, 262, and 265 of FIG. 2, which include reporting agents ("RAs"). A reporting agent that is embedded in a service node may be configured to collect performance indicators for that service node and report the performance indicators to the configuration manager 230. In other embodiments, a reporting agent may be a separate application running on a host entity configured to collect performance indicators from all service nodes running on the host entity and transmit the performance indicators to the configuration manager 230. Reporting agent 270 in FIG. 2 shows the reporting agent as being separate from the service nodes 264 running on host 3 244.

As a part of, or in addition to, updating the configuration profile or configuration settings for the load balancer 220, the configuration manager 230 is further configured to add host entities (e.g., servers, virtual machines, containers, or other endpoints) and/or service nodes (e.g., application instances, services, micro-services, processes, etc.) to the network environment 200 or remove host entities and/or service nodes from the network environment 200 based on the received performance indicators. Accordingly, the scale of the network environment 200 can adapt based on the performance of the network resources in the network environment and the workload demand. This enables a more customized configuration that uses network resources more efficiently with less cost as resources can scale up when needed and scale down when no longer in need.

Figure 3A:
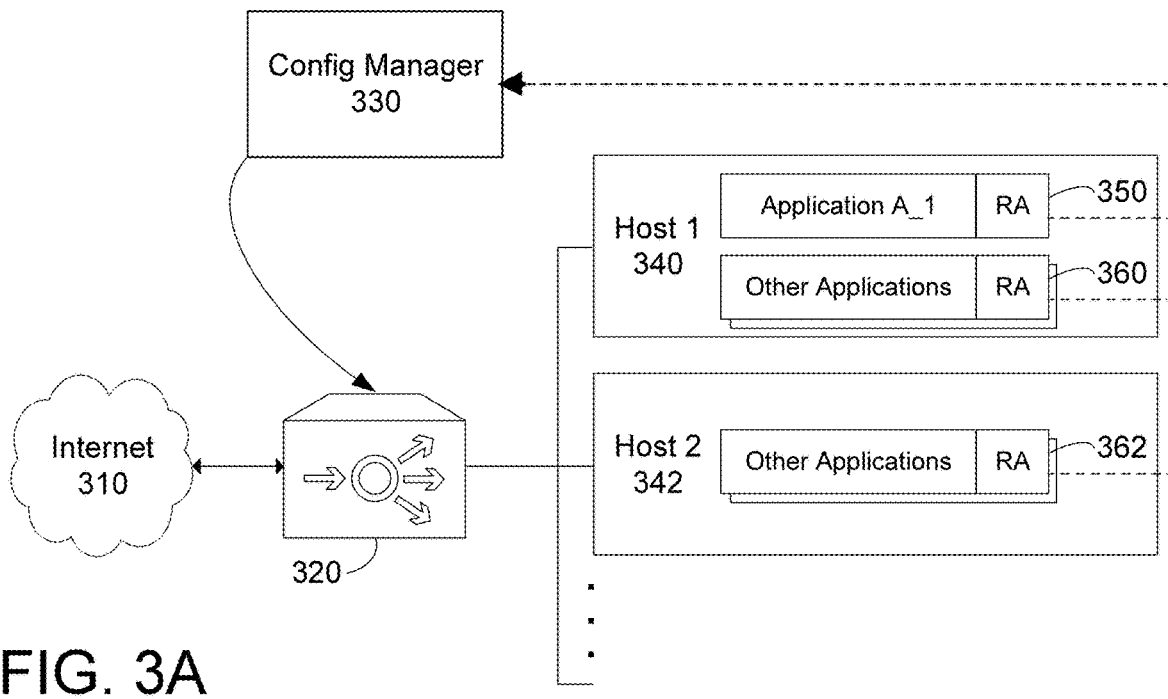
FIGS. 3A and 3B are example diagrams that help illustrate load balancing configuration changes performed by a configuration manager, in accordance with various aspects of the subject technology.
Figure 3B:
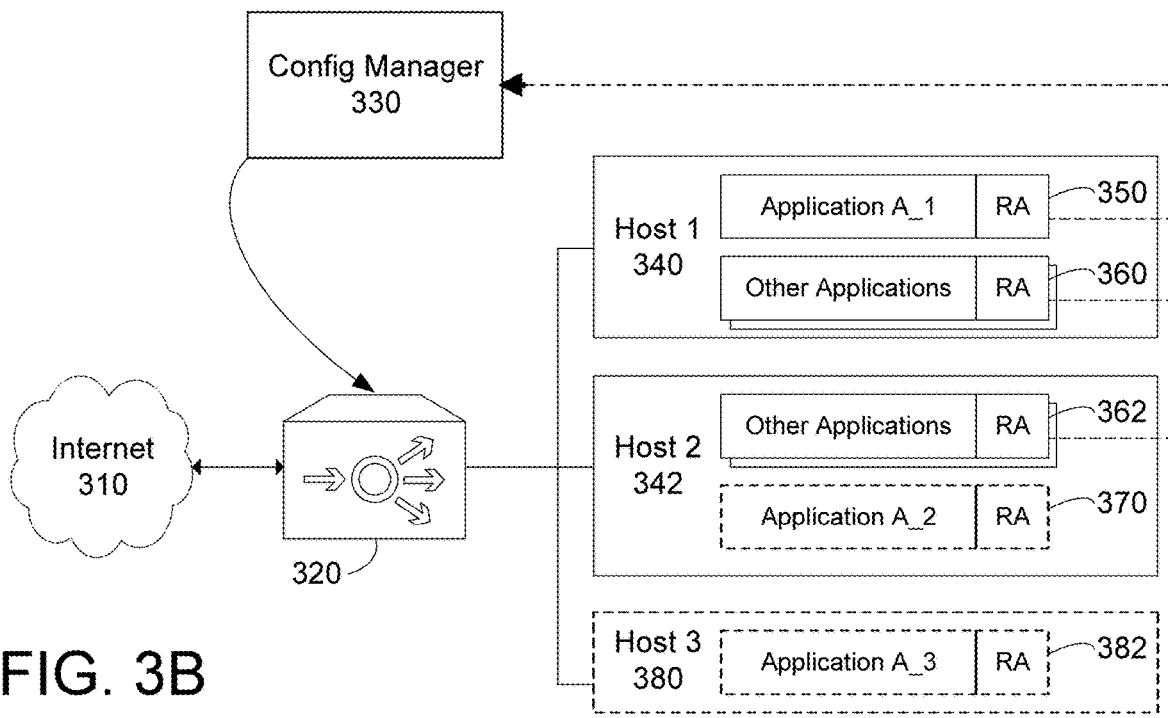

FIGS. 3A and 3B are example diagrams that help illustrate load balancing configuration changes performed by a configuration manager, in accordance with various aspects of the subject technology. FIGS. 3A and 3B show a network environment including a load balancer 320, a configuration manager 330, and host entities 340 and 342. An instance of Application A_1 350 is running on host 1 340 along with a number of other applications 360. Similarly, a set of other applications 362 also run on host 2 342. The host entities and/or the applications on the host may be registered with the configuration manager 330 so that a load balancer configuration may be generated that takes into account the network resources in the network environment and so that performance indicators can be properly tracked and monitored.

Requests or other workloads may be received by the load balancer 320 via the internet 310 or other network. The requests may be for a certain application such as "Application A" and, as a result, the load balancer may route the requests or other workloads to instances of Application A such as Application A_1 350 running on host 340.

FIG. 3A shows a network environment at a first period of time where an initial set of instances of Application A exist in the network environment. More specifically, only Application A_1 350 exists in the scenario illustrated in FIG. 3A. The load balancer 320, based on the configuration specified by the configuration manager 330, may distribute the requests associated with Application A to existing instances of Application A. Since only one instance of Application A exists in FIG. 3A, the instance of Application A 350 on host 1 340 receives a weight of 100, indicating that 100% of the requests for Application A are routed to Application A_1 350. A reporting agent may report performance indicators for the existing instances of Application A to the configuration manager 330.

Based on the performance indicators received by the configuration manager 330 during a period of time, the configuration manager 330 may determine that a change in the load balancing configuration of the network environment is needed. For example, the configuration manager 330 may determine that more or fewer service nodes are required or the weighting attributed to the existing service nodes by the load balancer 320 needs to be changed (e.g., sending less traffic to an overburdened service node or more traffic to an underutilized service node).

When adding service nodes (e.g., instances of Application A), the configuration manager 330 can take into consideration whether there are any host entities with available computing resources that can handle the additional burden of the added service node and select the most appropriate host entity. Alternatively, if there is not a satisfactory option in existing host entities, the configuration manager 330 may determine that a new host entity should be added to the network environment, add the new host entity, and instantiate an instance of the service node on the new host entity.

When removing service nodes, the configuration manager 330 may determine whether the host entity that a service node is removed from can also be removed from the network environment or shut down. For example, if the service node being removed is the only service node on the host entity, the host entity may be removed without affecting the operation of other service nodes. If there are other service nodes on the host entity, the configuration manager 330 can determine whether the remaining service nodes can be migrated to other host entities with available computing resources so that the host entity can be removed. If a service node and/or a host entity can be safely removed or if other service nodes can be safely migrated, the configuration manager 330 may implement the changes and update the configuration of the load balancer to reflect the changes and new locations of migrated service nodes.

To illustrate, FIG. 3B shows the network environment of FIG. 3A at a second period of time where a subsequent set of instances of Application A exist in the network environment. In the scenario illustrated in FIG. 3B, the configuration manager 330 has determined that one or more additional instances of Application A are needed based on the workload demand received from the load balancer and the performance indicators associated with Application A received by the configuration manager 330. Based on the performance indicators associated with Application A, the performance indicators associated with the other applications in the network environment, the performance indicators associated with the host entities, and/or the performance indicators associated with the load balancer 320 (e.g., the demand load for the various applications), the configuration manager 330 may determine if a second instance of Application A (e.g., Application A_2 370) should be initiated on an existing host such as host 2 342, if another instance of Application A (e.g., Application A_3 380) should be initiated on a new host such as host 3 380, or both.

Once a plan is generated by the configuration manager 330, the configuration manager 330 may execute the plan to facilitate the startup of the one or more instances of Application A. The configuration manager 330 is further configured to update the configuration or profile of the load balancer 320 to reflect the changes in the network environment whether that includes the addition of one or more instances of Application A or the addition of a new host entity (e.g., host 3 380). The update to the configuration of the load balancer 320 may further reflect a change in the weights used to distribute workloads to the service nodes. For example, where Application A_1 350 was receiving 100% of the load during the previous time period illustrated in FIG. 3A, the configuration of the load balancer 320 may be updated to reflect that Application A_1 350 is to receive 50% of the workload while Application A_2 may receive the remaining 50%. Alternatively, a larger number of service nodes may split the workload and not all service nodes may receive the same weight since the performance indicators for some service nodes may indicate an ability to handle additional workload while other service nodes may indicate an inability to handle certain levels of workload.

Figure 4:
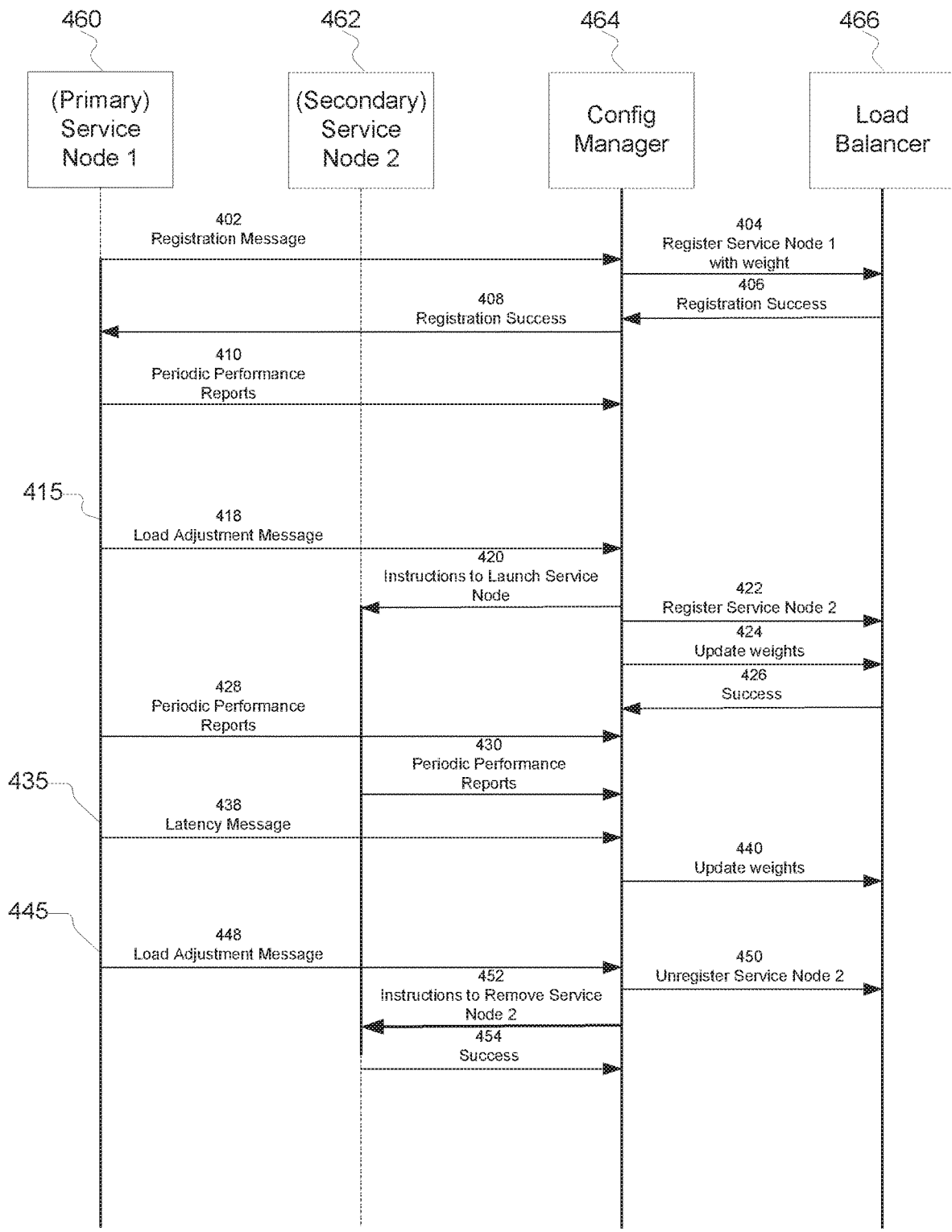
FIG. 4 is a communication diagram illustrating example scenarios for load balancing updates, in accordance with various aspects of the subject technology.

FIG. 4 is a communication diagram illustrating example scenarios for load balancing updates, in accordance with various aspects of the subject technology. However, other scenarios may also apply. When service node 460 (service node 1) (e.g., a first instance of an application) starts up on a host machine, it may be configured to transmit a registration message 402 to the configuration manager.

The registration message may include the following information:

App_Name—An identifier for service node (e.g., the application) or service node type to be registered App_Host_Name—An identifier for the host entity on which the service node is running App_Min_RAM_Need—The minimum RAM needed to start the service node; this variable may be provided by the by the application developer.

App_Host_OS_Need—This lists the operating systems on which this service node can be run (e.g., Windows, Ubuntu etc.)

App_Load_Respawn_Threshold—This is the number of pending jobs in the queue after which the service node requests load balancing partner. This value specifies a limit when for optimal performance, after which the service node may still handle workload jobs but under reduced performance.

App_Maximum_Acceptable_LB_Load—This is a maximum number of requests the service node can handle.

App_Internal_load_balanced_module_name_list—This is a list of submodules attached to a service node that supports redundancy. This list is used to respawn the submodules if the load is higher on that submodule. For example, if the service node (e.g., the application) is having database connector load so an addition connector is creator to support redundancy.

App_List_of_Supported_KPI—This is an additional list of key performance indicators (KPIs) that application can support apart from current list above.

In response to the registration message 402, the configuration manager 464 may notify the load balancer 466 of the registration of service node 460 or register service node 460 with the load balancer 466 using message 404. In the same communication or in a separate message, the configuration manager 464 may also specify a weight to be associated with service node 460 (e.g., 100% if service node 460 is the only service node of a particular type in the network environment). The load balancer 466 may respond with a registration success message 406 acknowledging the registration of service node 460. The configuration manager 464 may forward the registration acknowledgement 408 to service node 460.

Once registered, service node 460 may transmit periodic performance reports 410. The periodic performance reports may include the following information (as well as other metrics):

App_Name-An identifier for service node (e.g., the application) or service node type to be registered App_Host_Name-An identifier for the host entity on which the service node is running.

App_Current_processing_numbers-a current number of jobs in the queue that are pending.

App_Current_Acceptable_Load-a threshold representing a maximum load that can be processed at any given time by a service node. For example a node may be configured to handle a maximum of 1000 connections, but in some scenarios it may not be capable of handling connections to the maximum limit. This current acceptable load may represent the number of connections a service node can accept (which is less than max limit) due to system parameters. In this case acceptable load could be 800 (as against 1000 max limit) and the current load may be 200 (e.g., the number of connections currently being processed by the application).

This means the app can take 600 more connections as per the current system parameters.

In some embodiments, the service nodes may be configured to detect changes (e.g., a degradation or improvement that crosses various thresholds) in performance and transmit load adjustment messages to the configuration manager in response to the change. For example, at 415, a degradation in performance may occur where the service node determines that the current load may no longer be handled by the service node. The service node may request a load adjustment in a message 418 to the configuration manager 464. The load adjustment message 418 may explicitly request a load balancing action and/or specify a specific load balancing action from the configuration manager 464. In other embodiments, the load adjustment message 418 may include further performance indicators that may be used by the configuration manager 464 to determine whether a load balancing action is needed.

In some embodiments, the load adjustment message 418 may include:

App_Name—An identifier for service node (e.g., the application) or service node type to be registered App_Host_Name—An identifier for the host entity on which the service node is running.

App_Current_processing_numbers—The current number of jobs in the queue that is pending.

App_New_Acceptable_Load (100+X)—This value of X is calculated by the formula:

(App_Maximum_Acceptable_LB_Load App_Load_Respawn_Threshold)/100*(App_Load_Respawn_Threshold-App_Current_processing_numbers)

App_LB_New_Partner_needed—This is value is either TRUE or FALSE and list of the load balance partner name needed is in the below list. The value is TRUE if X is negative in value and FALSE when X is 0 or positive in value.

App_Internal_Module_experiencing_load_or_delay_name—Any module that is experiencing delays, this can be the name of the module itself or any of its sub modules.

Based on the load adjustment message 418, the configuration manager 464 may initiate the launch of an additional service node, which includes launching a new host entity (if necessary) and/or transmitting instructions 420 to launch the new service node and transmitting a registration request 422 to the load balancer 466 to register the new service node. The configuration manager 464 may also update the configuration of the load balancer 466 to update the weights 424 to be associated with the service nodes (e.g., 50% of workloads to service node 460 and 50% of workloads to service node 462 or 25% of workloads to service node 460 and 75% of workloads to service node 462). The load balancer may respond with a registration success message 426 acknowledging the registration of service node 462. Once registered, both service node 460 and service node 462 may transmit periodic performance reports 428 and 430.

In some embodiments, the service nodes may be configured to detect changes (e.g., a degradation or improvement that crosses various thresholds) in performance and transmit latency messages to the configuration manager 464 in to report the change. For example, at 435, a degradation in performance may occur where one of the service nodes (e.g., service node 460) detects a latency developing within the service node. The service node may report the latency in a message 438 to the configuration manager 464. The latency message 438 may simply report the latency along with associated performance indicators, explicitly request a load balancing action (e.g., a change in the weighting of service nodes), and/or suggest a specific load balancing action to the configuration manager 464. In other embodiments, the latency message 438 may include further performance indicators that may be used by the configuration manager 464 to determine whether a load balancing action is needed.

In some embodiments, the latency message 438 may include

App_Name—An identifier for service node (e.g., the application) or service node type to be registered App_Host_Name—An identifier for the host entity on which the service node is running.

App_Current_processing_numbers—The current number of jobs in the queue that is pending.

App_New_Acceptable_Load ($_{100}$+X)—This value of X is calculated by the formula:

(App_Maximum_Acceptable_LB_Load App_Load_Respawn_Threshold)/100*(App_Load_Respawn_Threshold-App_Current_processing_numbers)

App_Internal_Module_experiencing_load_or_delay_name—Any module that is experiencing delays, this can be the name of the module itself or any of its sub modules.

Based on the latency message 438, the configuration manager 464 may perform one or more load balancing actions. For example, the configuration manager 464 may transmit a configuration update 440 to the load balancer 466 in order to update the weights associated with the service nodes (e.g., rebalancing the distribution of workloads by reducing the workloads directed to service node 460 and increasing the workloads to service node 462).

In some embodiments, the service nodes may be configured to detect changes (e.g., an improvement) in performance and transmit load adjustment messages to the configuration manager 464 in response to the change. For example, at 445, an improvement in performance may occur where a service node determines that additional load may be handled. The service node may request a load adjustment in a message 448 to the configuration manager 464. The load adjustment message 448 may explicitly request a load balancing action and/or specify a specific load balancing action from the configuration manager 464. In other embodiments, the load adjustment message 448 may include further performance indicators that may be used by the configuration manager 464 to determine whether a load balancing action is needed.

Based on the load adjustment message 448, the configuration manager 464 may initiate the removal of a service node, which may include removing a host entity (if necessary). The configuration manager 464 may transmit instructions 450 to the load balancer 466 to unregister service node 462 as well as instructions 452 to service node 462 and/or the host entity on which service node 462 resides to remove service node 462 from service. The configuration manager 464 may also update the configuration of the load balancer 466 to update the weights 424 to be associated with the service nodes (e.g., 100% of workloads to service node 460). Service node 462 and/or the host entity on which service node 462 resides may respond with a success message 454 acknowledging the removal of service node 462.

Figure 5:
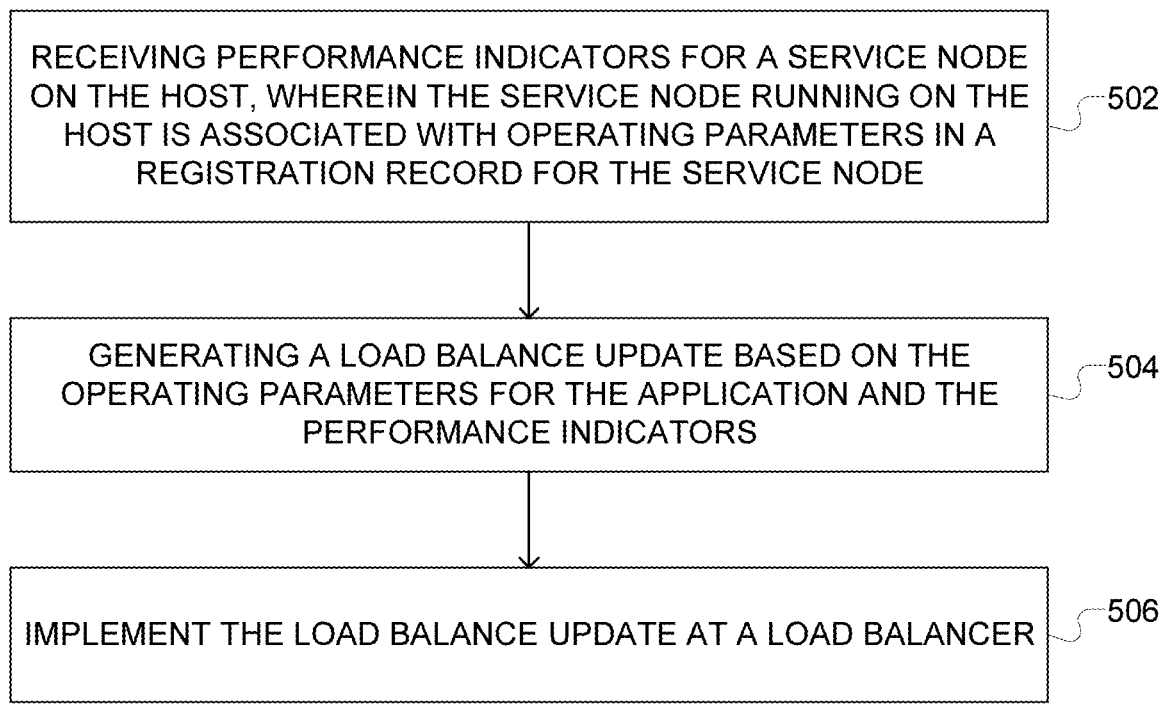
FIG. 5 is a flowchart illustrating an example method for implementing a load balancer update.

FIG. 5 is a flowchart illustrating an example method for implementing a load balancer update. The methods illustrated herein are provided by way of example, as there are a variety of ways to carry out the various methods disclosed. Additionally, while the example methods are illustrated with a particular order of blocks, operations, or steps, those of ordinary skill in the art will appreciate that the blocks, operations, or steps can be executed in any order and can include fewer or more blocks, operations, or steps than illustrated. Each block, operation, or step shown in FIG. 5 represents one or more steps, processes, methods, or routines in the methods. For the sake of clarity and explanation purposes, the FIG. 4 is described with reference to a configuration manager.

At operation 502, the configuration manager may receive, from one or more host entities, performance indicators for service nodes running on the host entities. For example, each service node may send a separate report to the configuration manager containing performance indicators for the service nodes and/or a host entity may send a report containing performance indicators for multiple service nodes running on the host entity. A host entity may include, for example a server machine, virtual machine, container, or other endpoint. A service node may include, for example, an application, service, micro-service, process, or other unit configured to process workloads running on a host entity. The service node may be registered with the load balancer and be associated with certain operating parameters that are specified in the registration record for the service node.

The operating parameters may include information contained in the registration message as discussed above. For example, the operating parameters may include a minimum RAM needed to start the service node, a list of operating systems on which this service node can be run (e.g., Windows, Ubuntu etc.), a number of pending jobs in the queue after which the service node requests load balancing partner, a maximum number of requests the service node can handle, a list of submodules attached to a service node that supports redundancy, or a list of key performance indicators (KPIs) that application can support apart from current list above.

At operation 504, the configuration manager may generate a load balance update, based on the operating parameters for the application and the performance indicators and, at operation 506, implement the load balance update at a load balancer. For example, the configuration manager may transmit instructions for the load balance update to the load balancer.

Figure 6:
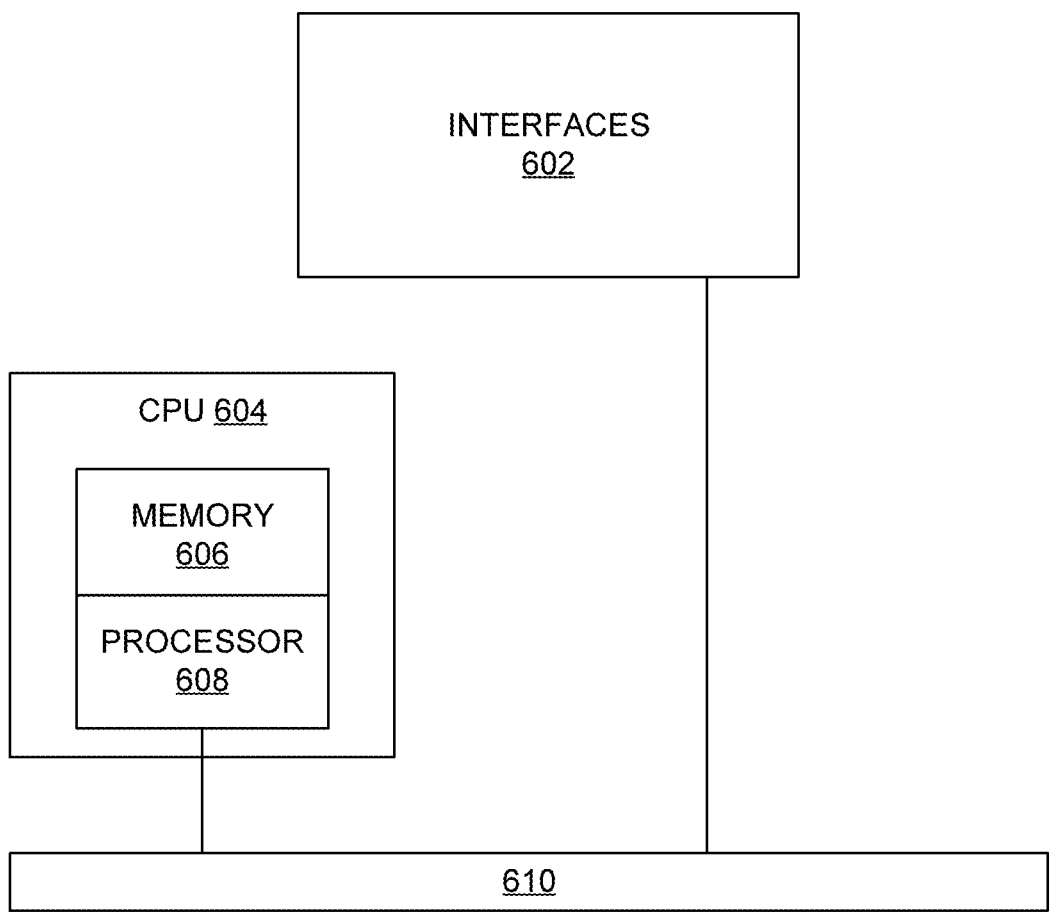
FIG. 6 illustrates an example network device in accordance with various embodiments.
Figure 7:
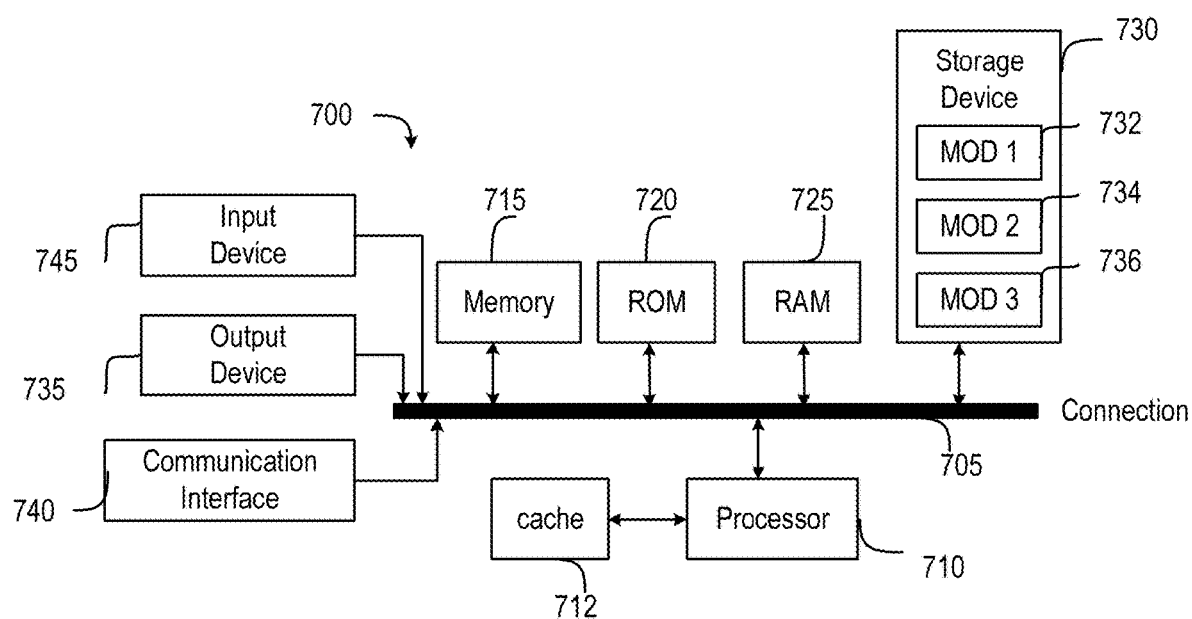
FIG. 7 illustrates an example computing device in accordance with various embodiments.

The disclosure now turns to FIGS. 6 and 7, which illustrate example network devices and computing devices, such as switches, routers, load balancers, client devices, and so forth.

FIG. 6 illustrates an example network device 600 suitable for performing switching, routing, load balancing, and other networking operations. Network device 600 includes a central processing unit (CPU) 604, interfaces 602, and a bus 610 (e.g., a PCI bus). When acting under the control of appropriate software or firmware, the CPU 604 is responsible for executing packet management, error detection, and/or routing functions. The CPU 604 preferably accomplishes all these functions under the control of software including an operating system and any appropriate applications software. CPU 604 may include one or more processors 608, such as a processor from the INTEL X86 family of microprocessors. In some cases, processor 608 can be specially designed hardware for controlling the operations of network device 600. In some cases, a memory 606 (e.g., non-volatile RAM, ROM, etc.) also forms part of CPU 604. However, there are many different ways in which memory could be coupled to the system.

The interfaces 602 are typically provided as modular interface cards (sometimes referred to as "line cards"). Generally, they control the sending and receiving of data packets over the network and sometimes support other peripherals used with the network device 600. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the master microprocessor 604 to efficiently perform routing computations, network diagnostics, security functions, etc.

Although the system shown in FIG. 6 is one specific network device of the present embodiment, it is by no means the only network device architecture on which the present embodiment can be implemented. For example, an architecture having a single processor that handles communications as well as routing computations, etc., is often used. Further, other types of interfaces and media could also be used with the network device 600.

Regardless of the network device's configuration, it may employ one or more memories or memory modules (including memory 606) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 606 could also hold various software containers and virtualized execution environments and data.

The network device 600 can also include an application-specific integrated circuit (ASIC), which can be configured to perform routing and/or switching operations. The ASIC can communicate with other components in the network device 600 via the bus 610, to exchange data and signals and coordinate various types of operations by the network device 600, such as routing, switching, and/or data storage operations, for example.

FIG. 7 illustrates a computing system architecture 700 wherein the components of the system are in electrical communication with each other using a connection 705, such as a bus. Exemplary system 700 includes a processing unit (CPU or processor) 710 and a system connection 705 that couples various system components including the system memory 715, such as read only memory (ROM) 720 and random access memory (RAM) 725, to the processor 710. The system 700 can include a cache of high-speed memory connected directly with, in close proximity to, or integrated as part of the processor 710. The system 700 can copy data from the memory 715 and/or the storage device 730 to the cache 712 for quick access by the processor 710. In this way, the cache can provide a performance boost that avoids processor 710 delays while waiting for data. These and other modules can control or be configured to control the processor 710 to perform various actions. Other system memory 715 may be available for use as well. The memory 715 can include multiple different types of memory with different performance characteristics. The processor 710 can include any general purpose processor and a hardware or software service, such as service 1 732, service 2 734, and service 3 736 stored in storage device 730, configured to control the processor 710 as well as a special-purpose processor where software instructions are incorporated into the actual processor design. The processor 710 may be a completely self-contained computing system, containing multiple cores or processors, a bus, memory controller, cache, etc. A multi-core processor may be symmetric or asymmetric.

To enable user interaction with the computing device 700, an input device 745 can represent any number of input mechanisms, such as a microphone for speech, a touch-sensitive screen for gesture or graphical input, keyboard, mouse, motion input, speech and so forth. An output device 735 can also be one or more of a number of output mechanisms known to those of skill in the art. In some instances, multimodal systems can enable a user to provide multiple types of input to communicate with the computing device 700. The communications interface 740 can generally govern and manage the user input and system output. There is no restriction on operating on any particular hardware arrangement and therefore the basic features here may easily be substituted for improved hardware or firmware arrangements as they are developed.

Storage device 730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 725, read only memory (ROM) 720, and hybrids thereof.

The storage device 730 can include services 732, 734, 736 for controlling the processor 710. Other hardware or software modules are contemplated. The storage device 730 can be connected to the system connection 705. In one aspect, a hardware module that performs a particular function can include the software component stored in a computer-readable medium in connection with the necessary hardware components, such as the processor 710, connection 705, output device 735, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" refers to at least one of a set and indicates that one member of the set or multiple members of the set satisfy the claim. For example, claim language reciting "at least one of A and B" means A, B, or A and B.

What is claimed is:

1. A computer-implemented method comprising:
   receiving, from a first host entity, performance indicators for an application running on the first host entity, wherein the performance indicators indicate a first performance of the application that is separate from a second performance of the first host entity on which the application is running, and wherein the application running on the first host entity is associated with operating parameters in a registration record for the application;
   generating, based on the operating parameters for the application and the performance indicators, a load balance update; and
   transmitting the generated load balance update to a load balancer.

2. The method of claim 1, further comprising transmitting, to a second host entity in response to the generated load balance update, instructions to launch an instance of the application on the second host entity.

3. The method of claim 1, further comprising:
   receiving additional performance indicators for one or more instances of the application running on one or more additional host entities; and
   determining, based on the additional performance indicators, a third performance of the one or more instances of the application relative to the first performance of the application running on the first host entity, wherein the generated load balance update is further based on the third performance of the one or more instances of the application.

4. The method of claim 1, further comprising transmitting, in response to the generated load balance update, instructions to launch a second host entity.

5. The method of claim 4, further comprising determining to launch the second host entity based on respective performance indicators from other applications running on the first host entity.

6. The method of claim 1, wherein the performance indicators for the application running on the first host entity comprise at least one of a current number of jobs in a queue for the application, average processing time, latency metrics, or error counts.

7. The method of claim 1, further comprising receiving a registration request from the application and generating the registration record for the application in response to the registration request.

8. The method of claim 1, wherein the generated load balance update comprises a change of weight parameters between two or more instances of the application.

9. The method of claim 1, wherein the generated load balance update comprises instructions to unregister the application running on the first host entity.

10. The method of claim 1, wherein the generated load balance update comprises instructions to unregister the first host entity.

11. The method of claim 1, wherein the host entity is a server machine.

12. A system comprising:
one or more processors; and
at least one computer-readable storage medium having stored therein instructions which, when executed by the one or more processors, cause the system to:
receive a plurality performance reports for a plurality of service nodes running on a plurality of host entities, wherein each performance report of the plurality of performance reports comprises performance indicators for a service node of the plurality of service nodes that is running on a host entity of the plurality of host entities, wherein the performance indicators indicate a first performance of the service node that is separate from a second performance of the host entity on which the service node is running, and;
generate a load balance update based on the performance reports; and
transmit the generated load balance update to a load balancer.

13. The system of claim 12, wherein the plurality of service nodes include at least one of: an instance of an application, a service, or a process.

14. The system of claim 12, wherein the instructions further cause the system to:
receiving a registration request for the service node in the plurality of service nodes; and
generate a registration record for the service node, wherein the registration record comprises operating parameters for the service node and wherein the generated load balance update is further based on the operating parameters for the service node.

15. The system of claim 12, wherein the instructions further cause the system to:
determine, based on respective performance indicators received for one or more service nodes, a third performance of the one or more service nodes relative to the first performance of the service node running on the host entity, wherein the generated load balance update is further based on the third performance of the one or more service nodes.

16. The system of claim 12, wherein the instructions further cause the system to transmit instructions to remove a particular host entity of the plurality of host entities that is determined to be unneeded based on the plurality of performance reports.

17. The system of claim 12, wherein the instructions further cause the system to transmit instructions to remove a particular service node of the plurality of service nodes that is determined to be unneeded based on the plurality of performance reports.

18. A non-transitory computer-readable medium comprising instructions stored therein which, when executed by one or more processors, cause the one or more processors to:
receive, from a first host entity, performance indicators for an application running on the first host entity, wherein the performance indicators indicate a first performance of the application that is separate from a second performance of the first host entity on which the application is running, and wherein the application running on the first host entity is associated with a registration record for the application;
generate a load balance update, based on the performance indicators; and
transmit the generated load balance update to a load balancer.

19. The non-transitory computer-readable medium of claim 18, wherein the instructions further cause the one or more processors to transmit, to a second host entity in response to the generated load balance update, instructions to launch an instance of the application on the second host entity.

20. The non-transitory computer-readable medium of claim 18, wherein the instructions further cause the one or more processors to transmit, in response to the generated load balance update, instructions to launch a second host entity.

* * * * *